US012805974B2

(12) United States Patent
Gollackner et al.

(10) Patent No.: US 12,805,974 B2
(45) Date of Patent: Nov. 24, 2026

(54) HANDPIECE WITH ROTARY KNOB TO OPERATE THE TOOL HOLDER

(71) Applicant: W&H Dentalwerk Burmoos GmbH, Bürmoos (AT)

(72) Inventors: Alois Gollackner, Thalgau (AT); Thomas Lang, Adnet (AT)

(73) Assignee: W&H Dentalwerk Bürmoos GmbH, Bürmoos (AT)

( * ) Notice: Subject to any disclaimer, the term of this patent is extended or adjusted under 35 U.S.C. 154(b) by 38 days.

(21) Appl. No.: 18/952,121

(22) Filed: Nov. 19, 2024

(65) Prior Publication Data

US 2025/0169920 A1 May 29, 2025

(30) Foreign Application Priority Data

Nov. 24, 2023 (EP) .................................... 23211879

(51) Int. Cl.
*A61C 1/14* (2006.01)

(52) U.S. Cl.
CPC ..................................... *A61C 1/14* (2013.01)

(58) Field of Classification Search
CPC ........... A61C 1/14; A61C 1/144; A61C 1/141; A61C 1/145; A61C 1/147; B23B 31/03; B23B 31/06; Y10T 279/3481; A61B 17/1673

See application file for complete search history.

(56) References Cited

U.S. PATENT DOCUMENTS 2,180,499 A * 11/1939 Beardsley .............. A61C 1/141 433/128
2,195,555 A * 4/1940 Beardsley .............. A61C 1/141 433/129
2,653,383 A * 9/1953 Uhler ....................... A61C 1/14 433/104
2,813,337 A * 11/1957 Uhler ....................... A61C 1/14 433/128
3,325,899 A 6/1967 Staunt
4,979,899 A 12/1990 Roemhild (Continued)

FOREIGN PATENT DOCUMENTS

DE 565506 C * 12/1932 ............... A61C 1/14
DE 3504075 A1 * 8/1985 ............. A61C 1/141

OTHER PUBLICATIONS

Machine translation of DE 3504075 (Year: 1985).*

*Primary Examiner* — Heidi M Eide
(74) *Attorney, Agent, or Firm* — Wood, Phillips, Katz, Clark & Mortimer

(57) ABSTRACT

As described herein, a handpiece comprises a head piece in which a tool holder is arranged rotatably about an axis of rotation, an actuating device which moves the tool holder selectively into a receive/release position, in which the treatment tool can be received in the tool holder or removed therefrom, and a holding position, in which the treatment tool is held in the tool holder. The actuating device comprises a link guide by which a rotary knob arranged on the head piece can be moved along the axis of rotation relative to the tool holder in such a way that, when the rotary knob is moved towards the tool holder, the tool holder is moved into the receive/release position, and when the rotary knob is moved away from the tool holder, the tool holder is moved into the holding position.

20 Claims, 3 Drawing Sheets

(56) References Cited

U.S. PATENT DOCUMENTS

| | | | | |
|---|---|---|---|---|
| 5,888,200 | A | 3/1999 | Walen | |
| 5,911,578 | A * | 6/1999 | Gross | A61C 1/144<br>433/129 |
| 6,227,854 | B1 | 5/2001 | Helfenbein et al. | |
| 2014/0199654 | A1 * | 7/2014 | Schwarzbraun | A61C 1/12<br>606/1 |

* cited by examiner

FIG. 5
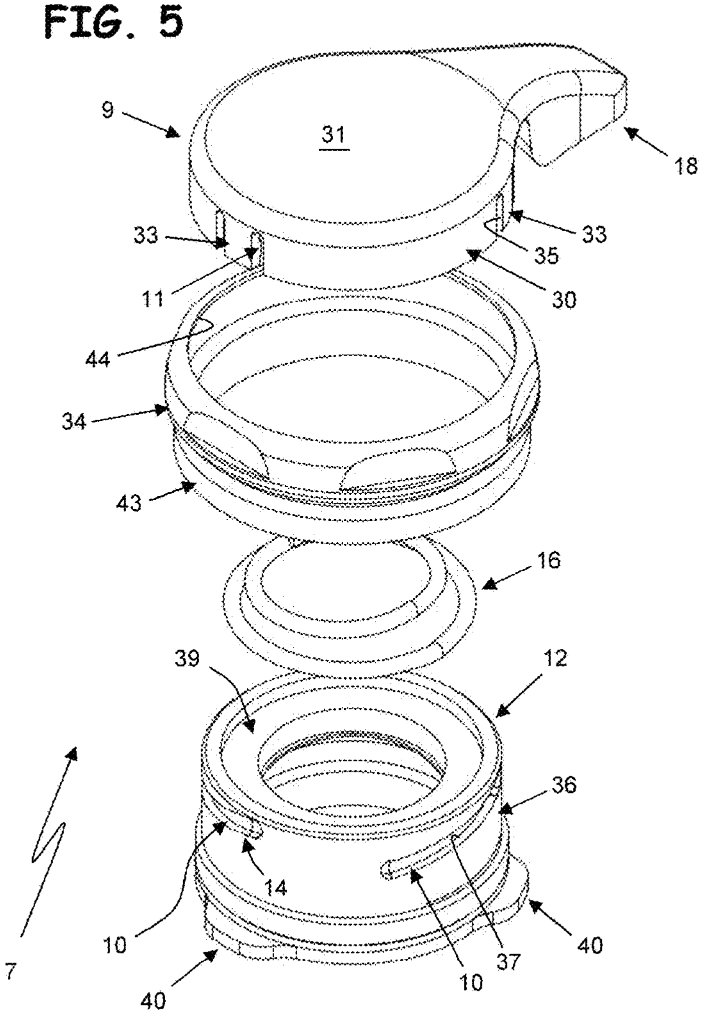
FIG. 6
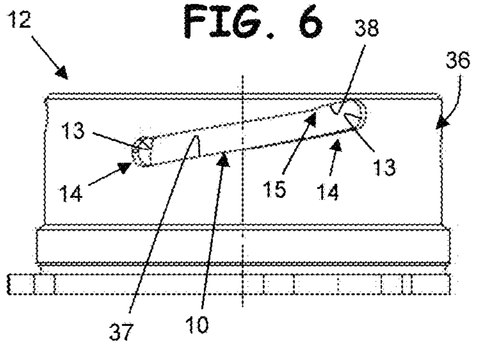
FIG. 8
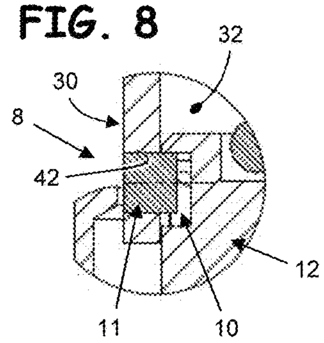
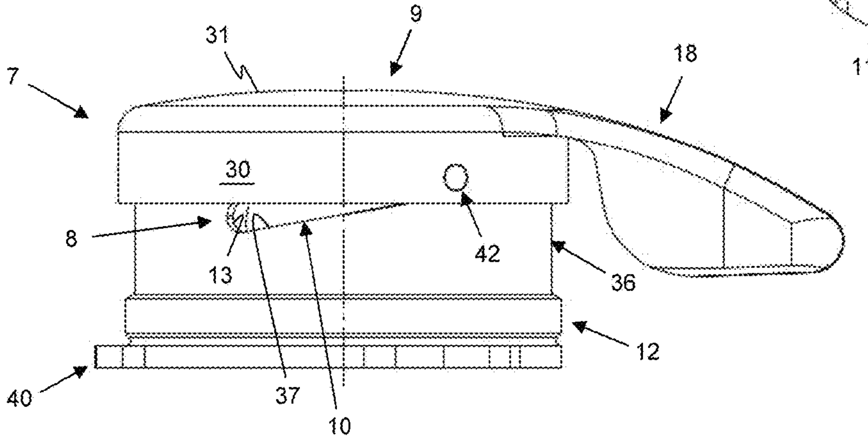
FIG. 7

FIG. 9
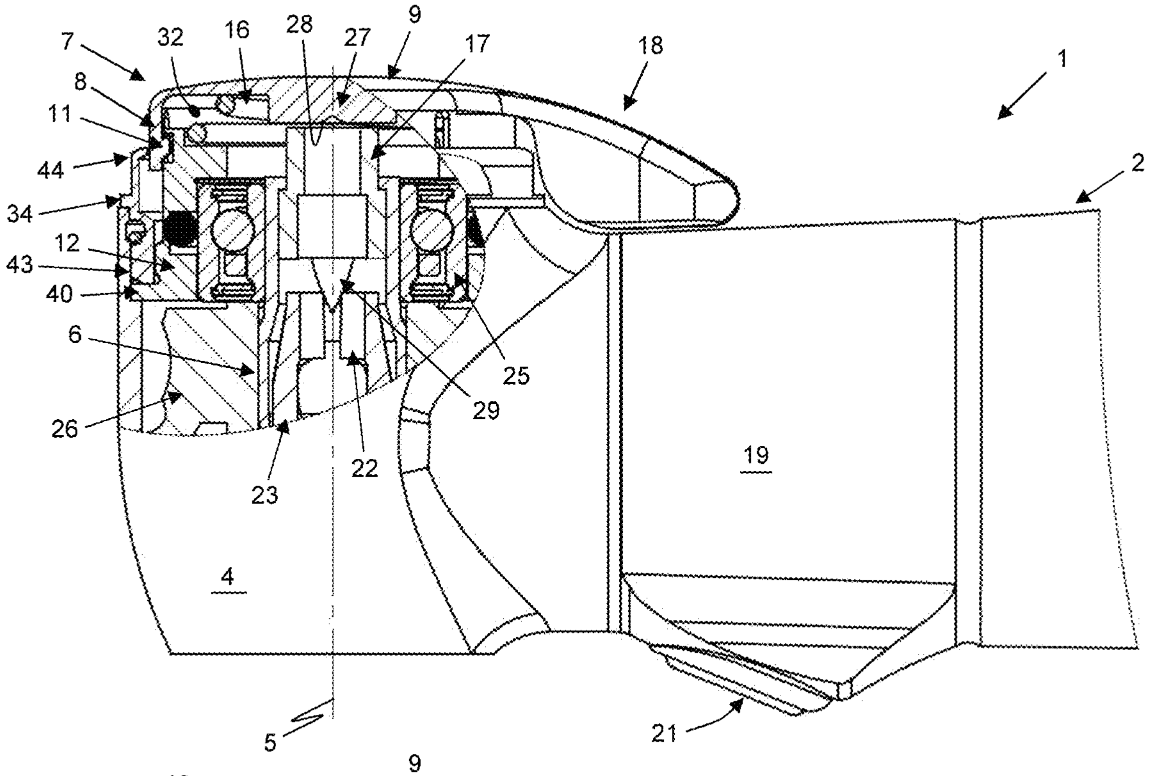
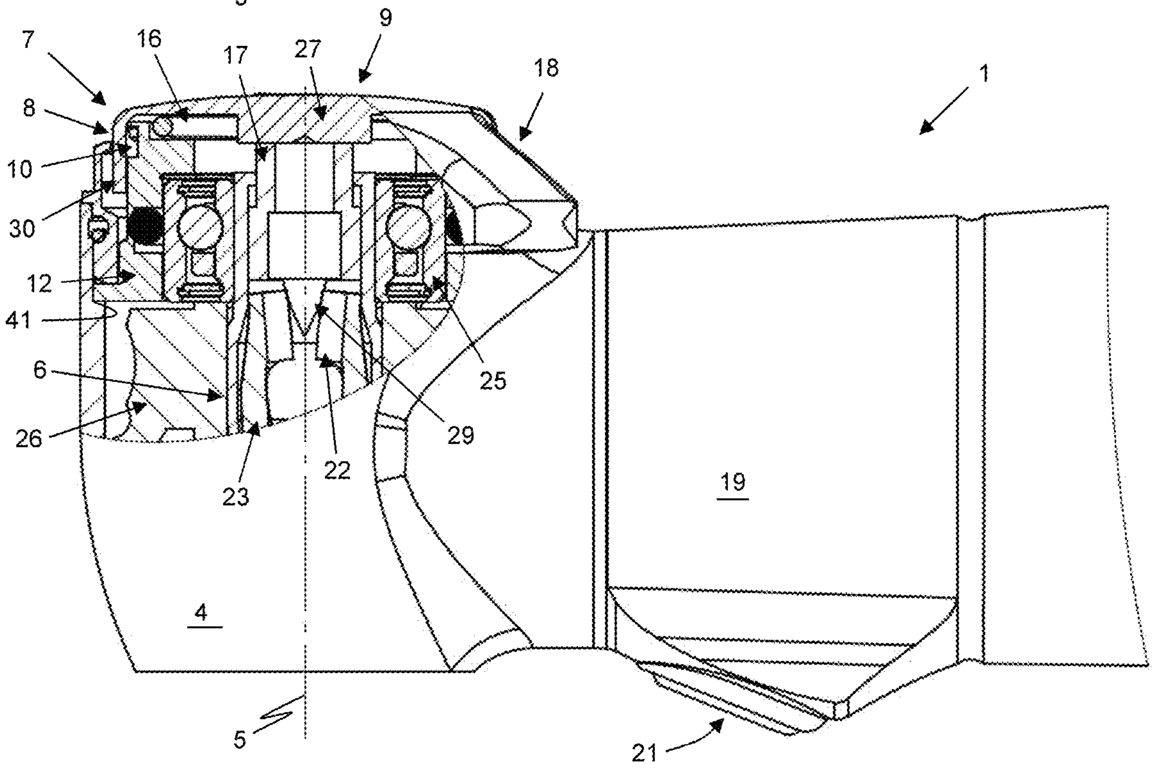
FIG. 10

HANDPIECE WITH ROTARY KNOB TO OPERATE THE TOOL HOLDER

CROSS REFERENCE TO RELATED APPLICATION

The present application claims priority from pending European Patent Application No. EP23211879.4, filed Nov. 24, 2023, which is incorporated herein by reference.

FIELD OF THE INVENTION

The present application relates to a medical, in particular dental, handpiece with a rotary knob for actuating a tool holder of the handpiece.

BACKGROUND ART

It is known that medical, in particular dental, handpieces are equipped with a detachable tool holder so that treatment tools can be exchanged depending on the treatment situation or cleaned after use. To release a treatment tool from the tool holder and preferably also to insert a treatment tool into the tool holder, an actuating device is provided which is configured to move the tool holder selectively into a receive/release position, in which the treatment tool can be inserted into or removed from the tool holder, and a holding position, in which the treatment tool is held in the tool holder.

Pushbuttons have been standard for many years for actuating the actuating device and/or as part of the actuating device, see for example patent U.S. Pat. No. 6,227,854 B1. In order to move the tool holder into the receive/release position, the user must push the push button located on the handpiece head, i.e. move the push button into the handpiece head and/or in the direction of the tool holder. Pushing the push button has several disadvantages: in particular, it is difficult for the user to recognize when pushing the push button whether the tool holder is already in the receive/release position or not and whether the treatment tool can therefore already be inserted or removed. Examples are known from practice in which in particular more cautious users or users with less strength have the impression that they are already pressing the push button hard enough, but the tool still cannot be inserted or removed. If this is attempted anyway, the tool holder may be damaged or there is a risk that the tool is not sufficiently clamped in the tool holder. Conversely, there are also cases in which users repeatedly actuate the actuating device with too much force, causing components of the actuating device, some of which are very fine, such as spring elements or bearings, to break.

Another disadvantage is the comparatively high force required to actuate the push button, while the size of the push button is small. In summary, it can therefore be said that operating a tool holder using a push button is tedious and impractical for a user. Nevertheless, handpieces with a push button for actuating the tool holder have been common practice in the dental field for many decades and are prevalent worldwide.

SUMMARY OF THE INVENTION

It is an object to remedy this situation and provide a medical, in particular dental, handpiece in which the treatment tool can be inserted into and/or removed from the tool holder more easily and conveniently for the user. In particular, the user should be able to recognize more clearly whether the tool holder has reached the receive/release position or the holding position. The force required to actuate the setting device should also be reduced or at least the user should have the impression that the actuating device can be operated with less force and more smoothly.

According to the present invention, these objects are achieved by a medical, in particular dental, handpiece according to claims 1 and 16. Particularly advantageous embodiments are specified in the dependent claims.

According to an embodiment a medical, in particular dental, handpiece comprises: a handle piece extending along a longitudinal axis, a head piece arranged at one end of the handle piece, a tool holder arranged in the head piece rotatably about an axis of rotation for detachably receiving a treatment tool, and an actuating device provided on the head piece and acting on the tool holder. The actuating device is configured to move the tool holder selectively into a receive/release position, in which the treatment tool can be inserted into or removed from the tool holder, and a holding position, in which the treatment tool is held in the tool holder. The actuating device has a link guide or slide guide through which a rotary knob arranged on the head piece can be moved along the axis of rotation relative to the tool holder in such a way that, when the rotary knob is moved towards the tool holder, the tool holder is moved into the receive/release position, and when the rotary knob is moved away from the tool holder, the tool holder is moved into the holding position.

The provision of an actuating device with a link or slide guide makes the operation of the actuating device of the handpiece noticeably more convenient for the user: The slide guide advantageously makes it possible to set defined end points for the movement of the actuating device and/or the rotary knob. This allows the user to recognize in an advantageous way, based on the rotatability of the actuating device and/or the rotary knob, whether the tool holder is in the receive/release position or the holding position or not. As soon as the actuating device and/or the rotary knob can no longer be rotated, the user knows that the treatment tool can be inserted into the tool holder, released from it or is reliably held in it. The link or slide guide also enables a comfortable, smooth rotary movement of the rotary knob with constant, low force required to operate the tool holder.

According to another embodiment a medical, in particular dental, handpiece comprises: a handle piece extending along a longitudinal axis, a head piece arranged at one end of the handle piece, a tool holder arranged in the head piece rotatably about an axis of rotation for releasably receiving a treatment tool, and an actuating device provided on the head piece and acting on the tool holder. The actuating device is configured to move the tool holder selectively into a receive/release position, in which the treatment tool can be inserted into or removed from the tool holder, and a holding position, in which the treatment tool is held in the tool holder. Furthermore, a rotary knob is arranged on the head piece, which can be moved through a maximum of 90° around the axis of rotation of the tool holder in order to move the tool holder between the receive/release position and the holding position.

The provision of a rotary knob with limited rotatability or a limited angle of rotation greatly facilitates the operability of the actuating device for the user: the limitation of the rotatability of the rotary knob, which is perceptible to the user, for example by haptic, visual and/or acoustic perception as described in detail below, allows the user to determine advantageously whether the tool holder is (already) in the receive/release position or the holding position. As soon as the rotary knob stops turning, the user knows that the treatment tool can be inserted into the tool holder, released from it or is reliably held in it.

The link guide is preferably configured in such a way that by actuating, i.e. turning, the rotary knob about the axis of rotation of the tool holder and/or relative to an outer sleeve of the head piece, the rotary knob can be moved along or longitudinally to the axis of rotation relative to the tool holder. The link or slide guide is preferably configured such that when the rotary knob is turned, the rotary knob simultaneously performs a rotary movement about the axis of rotation and a longitudinal movement along the axis of rotation of the tool holder. The link guide is preferably configured in such a way that turning the rotary knob in a first direction of rotation brings the rotary knob closer to the tool holder and/or moves the tool holder into the receive/release position. The link guide is preferably configured in such a way that turning the rotary knob in a second direction of rotation, which is in particular different from and/or opposite to the first direction of rotation, moves the rotary knob away from the tool holder and/or moves the tool holder into the holding position. These features further simplify the operability of the actuating device and guarantee reliable and durable usability of the actuating device and the handpiece.

The medical, in particular dental, handpiece is preferably configured as an angled handpiece or contra-angle handpiece, in which the axis of rotation of the tool holder and the longitudinal axis of the handle piece are arranged at an angle to each other, wherein the angle is not equal to 0°. The rotary knob can thus be arranged in a space-saving and ergonomically advantageous manner at one end of the head piece of the handpiece, opposite the insertion opening for the treatment tool.

The medical, in particular dental, handpiece comprises a drive device which is configured to set a treatment tool attached to the handpiece in a rotational movement. The drive device is preferably configured as a pneumatic drive device. The pneumatic drive device comprises, for example, a pneumatically drivable impeller, which is connected to the tool holder in a rotationally fixed manner, and one or more lines for a propellant gas, in particular compressed air, which deliver the propellant gas to the impeller in order to set the impeller and the tool holder in motion. Alternatively, the drive device is configured as a mechanical drive device. The mechanical drive device comprises mechanical drive elements such as a shaft, a gear, a gear wheel and/or an electric or pneumatic motor. These mechanical drive elements are operatively connected to the tool holder in order to set the tool holder in rotation. The actuating device with the rotary knob can therefore be used on pneumatically and mechanically driven handpieces, which advantageously reduces manufacturing costs for the handpiece.

The handle piece and the head piece or the handpiece are separated from the surrounding area by a single or multi-part outer sleeve. The head piece preferably has a head sleeve. The handle piece preferably has a straight or curved handle sleeve. The outer sleeve, head sleeve and handle sleeve are hollow so that components of the handpiece can be accommodated and/or stored therein.

The actuating device and in particular the rotary knob are preferably attached to the outer sleeve or head sleeve of the head piece. In particular, at least parts of the actuating device can also be accommodated inside the hollow outer sleeve or head sleeve.

The tool holder that can be rotated around the axis of rotation is configured, for example, as a force-locking or non-positive tool holder, for example with spring-loaded retaining elements, spring arms, retaining brackets or similar components. The tool holder that can be rotated about the axis of rotation is configured, for example, as a form-fit or positive tool holder. The tool holder preferably comprises a collet chuck. The tool holder is preferably connected to a tool holder opening in the outer sleeve or head sleeve, through which the treatment tool can be inserted into or removed from the tool holder, in particular the collet chuck. The actuating device with the rotary knob can thus be used on different types of tool holders, which advantageously reduces manufacturing costs for the handpiece.

Preferably, the link or slide guide has a link groove or slide groove and a link block or slide block guided in the link or slide groove, wherein the groove and the block are movable, in particular rotatable, relative to each other. Preferably, the link or slide groove and the link or slide block are provided on different components of the handpiece and/or the actuating device. For example, either the link groove or the link block is provided on the rotary knob. For example, either the link groove or the link block is provided on a link or slide sleeve of the handpiece. Particularly preferably, the block is provided on the rotary knob and the groove is provided on the link or slide sleeve. Alternatively, the block is provided on the link or slide sleeve and the groove is provided on the rotary knob. Alternatively, a first block and a first groove are provided on the rotary knob and a second block and a second groove are provided on the link or slide sleeve. The provision of the link or slide groove and the link or slide block on the rotary knob and the guide sleeve, thus on components of the handpiece that are arranged on its outer circumference, enables the user to perceive the end points of the movement of the actuating device and/or the rotary knob in a particularly clear and undistorted manner.

Preferably, the link or slide block provided on the rotary knob and/or the link or slide groove provided on the rotary knob is non-rotatably connected to the rotary knob and/or rotatable together with the rotary knob. Preferably, the link block provided on the rotary knob and/or the link groove provided on the rotary knob is configured in one piece with the rotary knob. Preferably, the link block provided on the rotary knob is configured as a separate element which is attached to the rotary knob, in particular in a rotationally fixed manner. Preferably, the link block provided on the rotary knob and/or the link groove provided on the rotary knob is/are arranged on a circumferential wall or annular wall of the rotary knob, wherein the circumferential wall or annular wall of the rotary knob is arranged in particular on an outer circumference of a cap of the rotary knob. Preferably, the link block provided on the rotary knob projects, in particular from the outer circumferential or annular wall, into an interior space of the rotary knob formed by the rotary knob, wherein the interior space is formed in particular by the cap and the outer circumferential or annular wall of the rotary knob arranged at an angle to the cap. These features enable the user to perceive the end points of the movement of the actuating device and/or the rotary knob in a particularly direct and advantageous manner.

Preferably, the link block provided on the rotary knob is provided on a resilient section of the outer circumferential wall or ring wall. This advantageously facilitates the mounting of the rotary knob on the handpiece, in particular the insertion of the link block into the link groove. Preferably, the resilient section of the outer circumferential wall or annular wall is formed by a spring tab on which the link block is arranged. Preferably, the spring tab is formed by incisions in the circumferential or annular wall, in particular by incisions arranged transversely to the circumference of the annular wall.

Preferably, the link or slide sleeve is arranged non-rotatably in the handpiece, in particular the head piece. Preferably, the link sleeve is arranged non-rotatably on the head sleeve, in particular on the inner wall of the head sleeve. Preferably, meshing locking elements are provided on the outside or on the outer circumference of the link sleeve and on the inside of the head sleeve, which prevents the link sleeve from rotating relative to the handpiece. The locking elements include, for example, projections, in particular tabs, and receptacles for the projections, for example indentations or recesses. The non-rotatable arrangement of the link sleeve in the handpiece guarantees reliable operability of the actuating device and link guide.

Preferably, the link or slide sleeve is configured as a hollow, cylindrical sleeve. This means that it can accommodate and/or support other components of the head piece, so that dimensions, in particular the height, of the head piece can be kept to a minimum in an advantageous manner. Preferably, shoulders, steps or similar elements can be provided on the inside of the link sleeve, which serve as bearing sites for components. Preferably, the link sleeve also comprises receptacles or bearing sites for components of the head piece on its outside. Components accommodated or mounted in or on the link sleeve comprise, for example, a bearing, in particular a rolling bearing for rotatably mounting the tool holder, at least parts of the tool holder, at least parts of the actuating device acting on the tool holder, a sealing element, a spring element and/or other components.

Preferably, the link block provided on the link sleeve and/or the link groove provided on the link sleeve is non-rotatably connected to the link sleeve. Preferably, the link block provided on the link sleeve and/or the link groove provided on the link sleeve is configured in one piece with the link sleeve. Preferably, the link block provided on the link sleeve is configured as a separate element which is attached to the link sleeve, in particular in a rotationally fixed manner. Preferably, the link block provided on the link sleeve and/or the link groove provided on the link sleeve is/are arranged on an outer side of a cylindrical sleeve wall of the link sleeve. These features enable the user in an advantageous manner to perceive the end points of the movement of the actuating device and/or the rotary knob particularly directly.

Preferably, the link or slide groove has an elongated and/or slit-like shape. Preferably, the link groove extends in an arc around the axis of rotation of the tool holder and/or around the link sleeve and/or inside the head piece. Preferably, the arc of a circle formed by the link groove has an angle of maximum 135°, preferably of maximum 100°, particularly preferably of about 45°-90°. Preferably, the link groove extends upwards around the axis of rotation of the tool holder and/or around the link sleeve and/or inside the head piece. Preferably, the spaced-apart ends of the link groove are arranged in different planes, in particular in different planes that are each arranged orthogonally to the axis of rotation. Preferably, the angle of inclination of the link groove is less than 15°, preferably about 8°-12°, particularly preferably about 10°. These features advantageously enable particularly smooth operation of the actuating device and/or link guide.

Preferably, the link or slide groove is closed, in particular at its ends. Preferably, the link groove has a wall at the, in particular closed, ends of its longitudinal extension, at which the longitudinal extension ends and/or which connects the link groove to the cylindrical sleeve wall of the link sleeve or the circumferential wall or annular wall of the rotary knob in which the link groove is formed. Preferably, the link groove or the link guide comprises stops at the ends of its longitudinal extension, which limit the movement of the link block guided in the link groove. Preferably, the stops are formed by the closed ends and/or walls of the link groove. The closed ends or the stops limit the movement of the link block and thus the rotation and movement of the rotary knob along the axis of rotation or relative to the tool holder. This provides the user in an advantageous way with clear feedback as to whether or not the tool holder is in the receive/release position or the holding position. As soon as the rotary knob stops rotating, the user recognizes beyond doubt that the treatment tool can be inserted into the tool holder, released from it or is reliably held in it.

Preferably, the link or slide groove has a shoulder or step at at least one end or end section, over which the link block guided in the link groove can be moved. Preferably, the shoulder or step is provided at that end of the elongate link groove which is closer to the rotary knob, in particular its cap. Preferably, the step is spaced from the closed end, the wall or the stop, so that the link or slide block can be accommodated between the step and the closed end, the wall or the stop after the step has been overcome. Preferably, that section of the link groove between the step and the closed end, the wall or the stop is configured as a recess, so that the link block engages in this recess with a sound, for example a clicking sound, after overcoming the step, thereby generating an acoustically perceptible sound and/or a haptically perceptible vibration. The engagement in the recess is preferably supported by a spring element which is arranged between the link sleeve and the rotary knob and biases these two elements against one another. In particular, the spring element causes the rotary knob to be abruptly moved away from the link sleeve due to the preload as soon as the link block has overcome the step, wherein the link block snaps into the recess with a noise and/or a noticeable vibration. The user thus advantageously receives clear or additional feedback about the state of the tool holder, in particular whether the holding position has been assumed.

Preferably, the link or slide guide comprises a plurality of link or slide grooves and link or slide blocks, for example two, three or four link grooves and link blocks, respectively, with one link block being accommodated and guided in one link groove. Preferably, the plurality of link grooves are arranged at a regular distance from one another. Preferably, the plurality of link blocks are arranged at a regular distance from one another. The provision of several link grooves and link blocks advantageously increases the quality of the operability of the link guide.

Furthermore, the link or slide block is preferably arranged or configured in such a way that it rotatably holds or fixes the rotary knob on the head piece. In particular, the reception or engagement of the link block in the link groove causes the rotary knob to be rotatably fixed to the head piece or to the handpiece. Preferably, the link block is held rotatably in the link groove by a screw ring that can be screwed to the head piece. By using the link block to fix the rotary knob to the headpiece, no further components are advantageously required, which makes the handpiece easier and cheaper to manufacture.

Preferably, the link or slide sleeve supports a spring element that pretensions the link sleeve and the rotary knob against each other. Additionally or alternatively, the spring element holds the rotary knob in a position remote from the tool holder. As a result, the tool holder is in particular also displaced into the holding position in which a treatment tool is held in the tool holder. Preferably, the spring element is configured as a disk spring or spiral spring. Preferably, the link sleeve comprises a shoulder, in particular on its outer side, on which the spring element is supported. Preferably, the spring element is located on the inside of the rotary knob, in particular the cap of the rotary knob. These features additionally ensure in an advantageous manner that a treatment tool held in the tool holder is reliably held in the tool holder.

Preferably, the handpiece, in particular the head piece or the actuating device, comprises an engagement element which is movable relative to the tool holder and which, when the rotary knob is moved/rotated, can also be moved in the direction of the tool holder by the approach of the rotary knob (along the axis of rotation) in the direction of the tool holder to move the tool holder into the receive/release position. When the rotary knob is turned in the opposite direction, i.e. when the rotary knob moves away from the tool holder, the engagement element can also be moved away from the tool holder, so that the tool holder takes the holding position. The engagement element thus advantageously transmits the movement of the rotary knob, in particular the movement along or longitudinally to the axis of rotation, to the tool holder, thereby moving it into the receive/release position or into the holding position.

The engagement element preferably comprises a wedge or is configured as a wedge sleeve, wherein the wedge is intended to engage in the tool holder or collet chuck in order to move the tool holder into the receive/release position or into the holding position. The wedge engages, for example, in spring elements of the tool holder and moves these, for example in spring lugs of a force-locking collet. Preferably, the engagement element is at least partially accommodated in the link or slide sleeve and/or passes through it. The provision of a wedge enables uniform actuation of the tool holder in an advantageous manner.

Preferably, the engagement element or at least a section thereof is configured as part of the rotary knob. Preferably, the engagement element or at least a section thereof is configured integrally with the rotary knob. Preferably, the engagement element or at least a section thereof is provided on the cap of the rotary knob, in particular on the inside of the cap. Preferably, the engagement element or at least a section thereof projects into the interior space of the rotary knob formed by the rotary knob, the interior space being formed in particular by the cap and the outer circumferential or annular wall of the rotary knob, which is arranged at an angle to the cap. Preferably, the engagement element or at least a section thereof extends from the rotary knob into or in the direction of the link sleeve. Preferably, the engagement element or at least a section thereof is movable together with the rotary knob in the rotational movement about and longitudinal movement along the axis of rotation described above. The provision of the engagement element as part of the rotary knob advantageously facilitates the manufacture and assembly of the handpiece.

Preferably, the engagement element or at least a section thereof is configured as an element spaced apart from and/or separate from the rotary knob, which can be contacted by the rotary knob by the approach of the rotary knob in the direction of the tool holder and can be moved with the rotary knob in the direction of the tool holder. Preferably, the engagement element or at least a section thereof is spaced from the rotary knob by an air gap, in particular when the tool holder takes the holding position. Preferably, the engagement element or at least a section thereof is supported on and/or accommodated in the tool holder. Preferably, the engagement element or at least a section thereof can be set in rotation with the tool holder. An engagement element spaced apart from the rotary knob advantageously reduces the risk of the rotary knob becoming very hot during operation of the handpiece.

Preferably, it is also conceivable that a first section of the engagement element is configured as part of the rotary knob, as described above, and a second section of the engagement element is spaced apart and/or configured separately from the rotary knob, as described above. When the rotary knob is actuated, the two sections of the engagement element contact one another and jointly transmit the movement of the rotary knob, in particular the movement along the axis of rotation, to the tool holder.

Preferably, a rotating arm is provided on the rotary knob for rotating the rotary knob, with the rotating arm extending along the outside of the handle. Preferably, the rotating arm is configured in one piece with the rotary knob. Preferably, the rotating arm is movable, in particular together with the rotary knob, and particularly preferably rotatable about the axis of rotation and displaceable along the axis of rotation. Preferably, the rotating arm is also movable relative to the longitudinal axis of the handle, in particular when it is moved along the axis of rotation. Preferably, the rotating arm is arranged in such a way that it approaches the longitudinal axis of the handle and moves away from it when it is moved along the axis of rotation. The rotary arm can thus be rotated with the rotary knob about the axis of rotation of the tool holder and at the same time is arranged in such a way that it approaches or moves away from the longitudinal axis of the handle as it rotates about the axis of rotation. Preferably, the rotating arm can be moved towards and away from the longitudinal axis of the handle. The provision of the rotating arm advantageously facilitates the operation of the rotary knob and thus the tool holder.

Preferably, at least a part of the rotating arm extends up to the handle part and/or over the handle part. Preferably, the rotating arm is spaced apart from the handle part or the handle sleeve, in particular by an air gap. Preferably, the rotating arm comprises an operating or gripping surface, which is arranged in particular adjacent to the head part and/or above the handle sleeve. Preferably, the gripping surface is arranged approximately orthogonally to the plane in which the cap of the rotary knob extends. These features make it even easier for the user to operate the rotary knob and the tool holder.

It is described above that the arc of a circle described by the link groove preferably has an angle of maximum 135°, see above. Since the shape and dimension of the link groove determines the movement and in particular the rotation of the rotary knob, the angle of rotation of the rotary knob substantially corresponds to the angle of the circular arc of the link groove: the circular arc or angle of rotation which the rotary knob describes in order to move the tool holder between the receive/release position and the holding position thus preferably has an angle of at most 135°, preferably of at most 100°, particularly preferably of about 45°-90°. These angles, in particular of a maximum of about 90°, additionally facilitate the operability of the actuating device, as only a slight movement of a finger or hand is required for this.

As can also be seen from the above, due to the shape and dimensions of the link or slide groove, in particular its pitch, by rotation about the axis of rotation the rotary knob is simultaneously movable along or longitudinally to the axis of rotation. It can also be seen from the foregoing that the rotatability of the rotary knob about the axis of rotation is limited by the at least one stop of the actuating device, in particular of the link groove. The link groove, in particular its shape and dimensions, thus advantageously determines the maximum angle of rotation through which the rotary knob can pass, the distance that the rotary knob can be displaced along the axis of rotation and the end position of the rotary knob by means of the at least one stop.

These and other embodiments will be described below with reference to the following drawings.

BRIEF DESCRIPTION OF THE DRAWINGS

FIG. 5 shows an exploded view of the actuating device and the rotary knob of FIG. 2;

FIG. 6 shows an embodiment of a link or slide sleeve of an actuating device having a link or slide guide;

FIG. 7 shows an external view of a second embodiment of an actuating device having a link or slide guide and a rotary knob to operate a tool holder of a medical, in particular dental, handpiece;

FIG. 8 shows a detail of the actuating device of FIG. 7 in an enlarged view;

FIG. 9 shows an embodiment of a medical, in particular dental, handpiece, in which the rotary knob is moved away from the tool holder and the tool holder takes a holding position, in which a treatment tool is held in the tool holder;

FIG. 10 shows the medical, in particular dental, handpiece of FIG. 9 with the rotary knob rotated and moved towards the tool holder and the tool holder takes a receive/release position, in which a treatment tool can be inserted into or removed from the tool holder.

DETAILED DESCRIPTION OF THE PREFERRED EMBODIMENT

Figure 1:
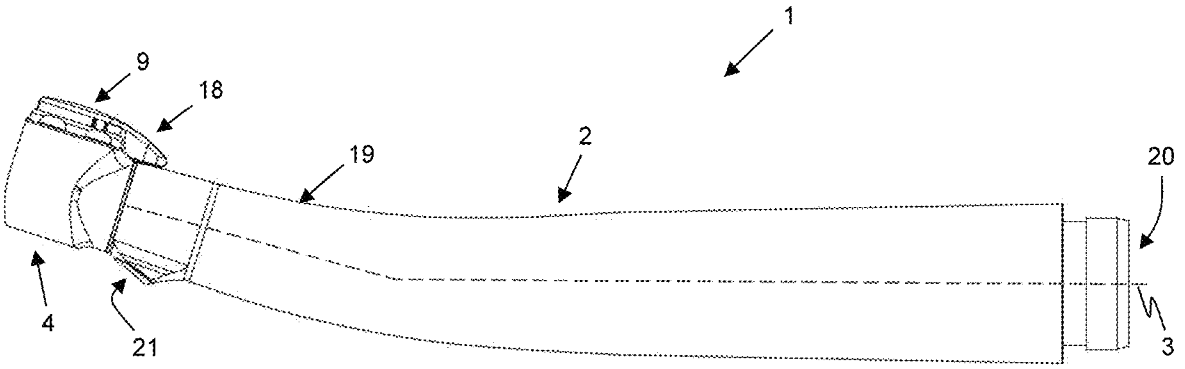
FIG. 1 shows an external view of a medical, in particular dental, handpiece according to the invention.

FIG. 1 shows a medical, in particular dental, handpiece 1 having a curved handle piece 2 extending along a longitudinal axis 3 and a head piece 4 arranged at an end of the handle piece 2. An outer sleeve 19 delimits the handpiece 1 from the der surroundings. The outer sleeve 19 is formed in particular by a head sleeve and a handle sleeve. A coupling device 20 is provided at an end of the handle piece 2, which is opposite to the head piece 4, to detachably couple the handpiece 1 to a media source, such as air or water, a regulating or controlling device and/or a power source, such as compressed air or electrical energy. Preferably, an illuminating device 21 for the emission of radiation, in particular visible light, onto a treatment tool and/or a treatment site is arranged at the end of the handle piece 2 that is close to the head piece 4.

FIGS. 9 and 10 show a head piece 4 of a handpiece 1 in a partial sectional representation. It can be seen that in the head piece 4 a tool holder 6 is rotatably arranged around a rotation axis 5. The tool holder 6 is provided to detachably hold a treatment tool (not shown). The tool holder 6 shown in FIGS. 9 and 10 is configured as a force-locking tool holder with a collet or clamping sleeve 23 and spring-loaded clamping lugs 22. Force-locking tool holders in various embodiments are familiar to the skilled person, so that their structure and function will not be discussed further.

Handpiece 1 of FIGS. 1, 9 and 10 is pneumatically operated. A pneumatic line conveys compressed air from the coupling device 20 through the handle piece 2 to an impeller 26 which is rotatably arranged in the head piece 4. By directing the compressed air to the impeller 26, it can be rotated together with the tool holder 6, which is non-rotatably coupled to the impeller 26. Alternatively, the handpiece 1 can also be configured as a mechanical handpiece with a drive shaft, a gear wheel and/or a gearbox. The tool holder 6 and the impeller 26 are rotatably supported in the head piece 4 by at least one roller bearing 25, in particular ball bearing.

An actuating device 7 is provided on or in the head piece 4, which acts on the tool holder 6 and is configured to move the tool holder 6 selectively into a receive/release position, in which the treatment tool can be received in or removed from the tool holder 6 (see FIG. 10), and a holding position, in which the treatment tool is held in the tool holder 6 (see FIG. 9). The actuating device 7, see also FIGS. 2-8, comprises a link guide 8, by which a rotary knob 9 arranged on the head piece 4 can be moved along or longitudinally to the axis of rotation 5 relative to the tool holder 6.

The actuating device 7 is configured such that when the rotary knob 9 is moved towards the tool holder 6, the tool holder 6 is moved to the receive/release position, and when the rotary knob 9 is moved away from the tool holder 6, the tool holder 6 is moved to the holding position. This is shown in FIGS. 9 and 10: in FIG. 9, the rotary knob 9 is in a first position in which it is remote from the tool holder 6 and a rotary arm 18 of the rotary knob 9 is arranged substantially parallel to the handle 2 and/or the longitudinal axis 3. Between the collet 23 and the rotary knob 9 there is arranged an engagement element 17 with a wedge 29, which is supported in the head piece 4 so as to be displaceable along the axis of rotation 5. The rotary knob 9, in particular a hump 27 provided on the inside of the rotary knob 9, is spaced from the engagement element 17 by an air gap 28. The engagement element 17, like the rotary knob 9, is located in a position remote from the tool holder 6. Thus, the engagement element 17, in particular its wedge 29, does not engage or only slightly engages the clamping lugs 22 of the collet 23, as a result of which the clamping lugs 22 are in a position radially approximated to the axis of rotation 5. In this position, the tool holder 6 takes the holding position in which a treatment tool is held in the tool holder 6. The clamping lugs 22 clamp the treatment tool between them.

In FIG. 10, the rotary knob 9 is in a second position, in which it is moved closer to the tool holder 6 by moving along the axis of rotation 5 towards the tool holder 6, guided by the link guide 8. The rotary knob 9, in particular a hump 27 provided on the inside of the rotary knob 9, contacts the engagement element 17 and pushes it in the direction of the tool holder 6 during its movement along the axis of rotation 5. Thus, the engagement element 17, in particular its wedge 29, engages the clamping lugs 22 of the collet chuck 23 in such a way that the clamping lugs 22 are in a position radially removed or spread apart from the axis of rotation 5. In this position, the tool holder 6 takes the receive/release position, in which a treatment tool can be received in or released from the tool holder 6.

When the rotary arm 18 is rotated back into its first position shown in FIG. 9, the rotary knob 9, again guided by the link guide 8, moves away from the tool holder 6 along the axis of rotation 5. This movement is supported in particular by a spring element 16, which is mounted on a link sleeve 12 and pretensions the rotary knob 9 against the link sleeve 12. The engagement element 17, following the rotary knob 9, also moves along the axis of rotation 5, so that the wedge 29 does not engage or engages only slightly the clamping lugs 22 of the collet 23. Thus, the clamping lugs 22 can return to their position radially approximated to the axis of rotation 5.

FIGS. 2-6 show in detail a first embodiment of an actuating device 7 with link guide 8 and rotary knob 9 for actuating the tool holder 6. The link guide 8 comprises several link grooves 10 and several link blocks 11. The link guide 8 shown in the Figures comprises three link grooves 10 and three link blocks 11, respectively, but there can also be more or fewer, for example two, four or five link grooves 10 and link blocks 11. However, three link grooves 10 and link blocks 11 are considered to be the best solution, as an optimum compromise between reliable guidance and not too high manufacturing costs is realized here. Regardless of the number of link grooves 10 and link blocks 11, one link block 11 is accommodated in each link groove 10 and is guided therein.

According to FIGS. 2-10, the link blocks 11 are arranged on the rotary knob 9, rotatable together with the rotary knob 9 and displaceable along or parallel to the axis of rotation 5. According to FIGS. 2-6, the link blocks 11 are formed in one piece with the rotary knob 9. The link blocks 11 are arranged on an outer annular wall 30 of the rotary knob 9, the outer annular wall 30 being arranged on an outer circumference of a cap 31 of the rotary knob 9 and at an angle to the cap 31. The link blocks 11 project from the outer annular wall 30 into an inner space 32 of the rotary knob 9, which is formed by the cap 31 and the outer annular wall 30 arranged at an angle to the cap 31.

Figure 2:
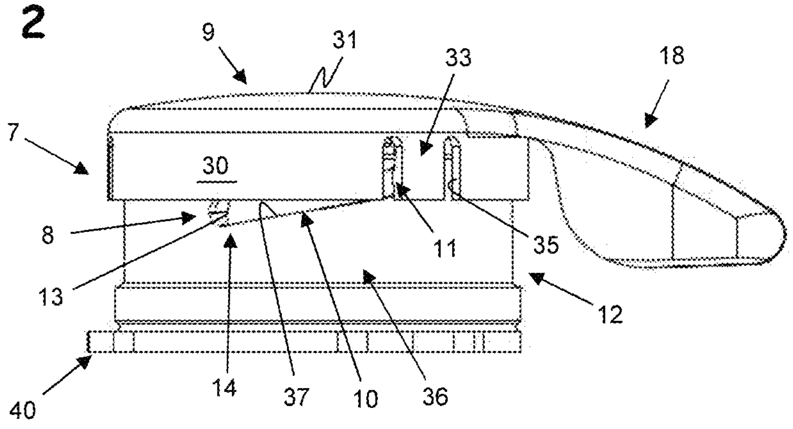
FIG. 2 shows an external view of a first embodiment of an actuating device having a link or slide guide and a rotary knob to operate a tool holder of a medical, in particular dental, handpiece.
Figure 4:
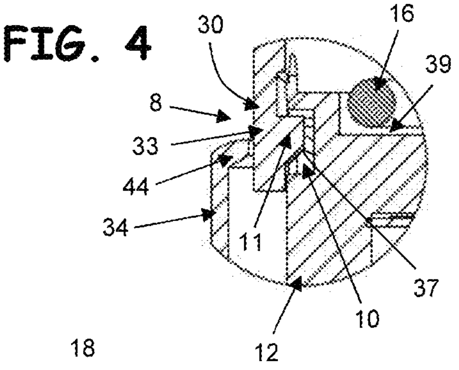
FIG. 4 shows the detail of the actuating device marked in FIG. 3 in an enlarged view.
Figure 3:
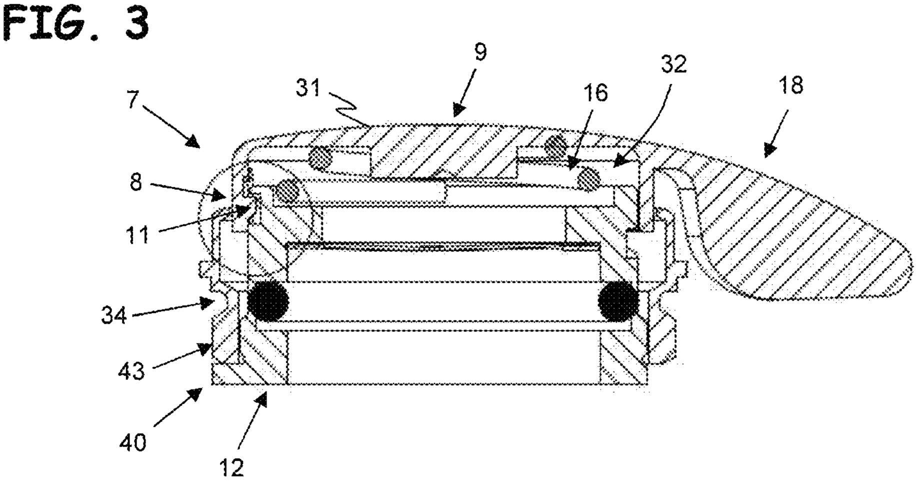
FIG. 3 shows a sectional view through the actuating device and the rotary knob of FIG. 2.

The link blocks 11 are provided on a resilient section 33 of the outer annular wall 30 to facilitate the insertion of the link blocks 11 into the link grooves 10 during the assembly of the handpiece 1, see in particular FIGS. 2 and 5. The resilient section 33 of the outer annular wall 30 is formed, for example, by spring tabs. A link block 11 is arranged on each resilient section 33, i.e. each spring tab, and is formed in particular in one piece with the resilient section 33. The resilient sections 33 are formed by incisions 35 in the outer ring wall 30.

The link grooves 10 are provided on the link sleeve 12. The link grooves 10 are slot-shaped millings in the shell or in a cylindrical sleeve wall 36 of the link sleeve 12, see in particular FIG. 5. The link grooves 10 comprise side walls 37, on which in particular the link blocks 11 are guided and/or supported. The link grooves 10 extend in an arcuate ascending manner in the sleeve wall 36 and around the axis of rotation 5 of the tool holder 6. The length and pitch of the link grooves 10 of a link sleeve 12 are the same, so that the movement of the rotary knob 9 is uniform.

The link grooves 10 comprise closed ends 14 at the ends of their longitudinal extensions. Stops 13 are provided at these closed ends 14 and/or the closed ends 14 form stops 13. The stops 13 limit the movement of the link blocks 11 and thus the rotation of the rotary knob 9 about and the movement of the rotary knob 9 along the axis of rotation 5 or relative to the tool holder 6. When the link blocks 11 contact the stops 13 and the rotation of the rotary knob 9 is thus stopped, the user recognizes without a doubt, depending on the position of the rotary arm 18, that the tool holder 6 is in the receive/release position or the holding position.

A shoulder or step 15 is provided at least at one end 14 of the link grooves 10, over which a link block 11 guided in a link groove 10 can be moved, see in particular FIG. 6. The step 15 is arranged at that end of an elongate link groove 10 which is closer to the cap 31 of the rotary knob 9. The step 15 is spaced from the closed end 14 and/or the stop 13, so that a link block 11 can be accommodated between the step 15 and the closed end 14 or the stop 13 after passing over the step 15. The section of a link groove 10 between the step 15 and the closed end 14 or the stop 13 is additionally configured as a recess 38, so that the link block 11 engages this recess 38 with an acoustically perceptible noise and/or a haptically perceptible vibration after overcoming the step 15. In this way, the user advantageously receives clear or additional feedback on the state of the tool holder, in particular the engagement of the holding position.

The link sleeve 12 is configured as a hollow, cylindrical sleeve, see in particular FIGS. 5 and 6. It can thus, for example at shoulders or recesses, accommodate and/or support other components of the head piece 4 in its interior, for example the rolling bearing 25, the engagement element 17, at least parts of the collet 23 and/or the tool holder 6, see FIGS. 9, 10. The outside of the link sleeve 12 or its cylindrical sleeve wall 36 can also comprise a receptacle or bearing site 39 for components of the head piece 4, for example for the spring element 16.

To prevent rotation of the link sleeve 12 in the head piece 4, in particular during rotation of the rotary knob 9, projections 40 are provided on the outer side or the cylindrical sleeve wall 36 of the link sleeve 12, see in particular FIG. 5. On the inside of the head sleeve of the outer sleeve 19, recesses 41 are provided for receiving the projections 40, see FIGS. 9 and 10. The recesses 41 and projections 40 form engaging locking elements which prevent the link sleeve 12 from rotating relative to the handpiece 1.

A rotary arm 18 is provided on the rotary knob 9 to make it easier to rotate the rotary knob 9. The rotating arm 18 is formed in one-piece with the rotary knob 9. The rotating arm 18 extends along the outside or handle sleeve of the handle 2, in particular parallel to the handle 2 when the tool holder 6 is in the holding position. The rotary arm 18 can be rotated together with the rotary knob 9 about the axis of rotation 5 of the tool holder 6 and simultaneously with the rotation, together with the rotary knob 9, approaches the tool holder 6 and the longitudinal axis 3 of the handle 2 or moves away from it during the counter-movement.

The actuating device 7 is attached to the head piece 4 by a screw ring 34, see in particular FIGS. 5 and 9. The screw ring 34 comprises a thread 43 on its outer side, which can be screwed to an internal thread on the inner side of the head sleeve of the head piece 4. By screwing the two threads together, the screw ring 34, in particular a narrow side of the screw ring 34, presses the projections 40 of the link sleeve 12 into the recesses 41 and thereby fixes the link sleeve 12 in the head piece 4. The screw ring 34 further comprises an annular collar 44 which surrounds the rotary knob 9, in particular its outer annular wall 30, when the screw ring 34 is screwed to the head piece 4. The collar 44 of the screw ring 34 makes contact with the outer ring wall 30 and presses the link blocks 11 in particular into the respective link grooves 10. As a result, the rotary knob 9 is rotatably attached to the link sleeve 12 and to the head piece 4. By engaging in the link grooves 10, the link blocks 11 thus ensure that the rotary knob 9 is rotatably held or fixed on the head piece 4.

The actuating device 7 with link guide 8 and rotary knob 9 for actuating a tool holder 6 of FIGS. 7 and 8 comprises the same structure as the actuating device of FIGS. 2-6, so that reference is made to the description of the actuating device of FIGS. 2-6 to avoid repetition. The only difference to the actuating device of FIGS. 2-6 is that the link blocks 11 provided on the rotary knob 9 are configured as separate elements, see in particular FIG. 8. On the rotary knob 9, in particular on its outer annular wall 30, a hole 42 is provided for each link block 11, into which a link block 11 is inserted, for example pressed in and/or glued. The link blocks 11 are thus in turn non-rotatably attached to the rotary knob 9 and rotatable together with the rotary knob 9 and displaceable along the axis of rotation 5, as described above. The link blocks 11 are formed, for example, by pins. The formation of the link blocks 11 as separate elements facilitates the mounting of the rotary knob 9 on the head piece 4. This allows the outer ring wall 30 to be formed as a continuous element without incisions 35 to form the resilient sections 33 with the link blocks 11.

In FIGS. 1-10, the actuating device 7 or the rotary knob 9 is configured such that the rotary knob 9, starting from the first position in which it is remote from the tool holder 6 and/or the rotary arm 18 is arranged essentially parallel to the handle 2 and/or the longitudinal axis 3, can be rotated clockwise into the second position in which the rotary knob 9 is approximated to the tool holder 6. Of course, it is also possible to design the actuating device 7, in particular the link grooves 10, in such a way that the rotary knob 9, starting from the first position, can be rotated counterclockwise into the second position. According to FIGS. 1-10, the link grooves 10 are configured such that they approach the tool holder 6 in a clockwise direction. In order to realize the alternative counterclockwise direction of rotation of the rotary knob 9, the link grooves 10 must be formed such that they approach the tool holder 6 in an anticlockwise direction.

The embodiments described or presented serve in particular to illustrate the invention. The features disclosed in an embodiment are therefore not limited to that embodiment but can be combined individually or together with one or more features of one of the other embodiments.

The invention claimed is:

1. A medical or dental, handpiece, comprising:

a handle piece extending along a longitudinal axis, a head piece arranged at an end of the handle piece, a tool holder arranged in the head piece rotatably about an axis of rotation for detachably receiving a treatment tool, an actuating device provided on the head piece and acting on the tool holder, which is configured to move the tool holder selectively into a receive/release position, in which the treatment tool can be received in the tool holder or removed therefrom, and a holding position, in which the treatment tool is held in the tool holder, wherein the actuating device comprises a rotary knob that is arranged on the head piece and includes an annular wall rotational relative to a link sleeve, and a link guide comprises one of the annular wall and link sleeve including a link groove that extends in an arcuate ascending manner and the other of the annular wall and the link sleeve including a link block that extends into the link groove so that when the rotary knob is rotated relative to the link sleeve, the rotary knob is moved along the axis of rotation relative to the tool holder in such a way that, when the rotary knob is moved towards the tool holder, the tool holder is moved into the receive/release position, and when the rotary knob is moved away from the tool holder, the tool holder is moved into the holding position, wherein movement of the rotary knob along the axis of rotation of the tool holder is simultaneous with rotation of the rotary knob about the axis of rotation.

2. The medical or dental handpiece according to claim 1, wherein the link block is provided on the rotary knob and is configured to rotate with the rotary knob.

3. The medical or dental handpiece according to claim 1, wherein the link groove is provided on the link sleeve.

4. The medical or dental handpiece according to claim 1, wherein the link groove extends about the axis of rotation of the tool holder.

5. The medical or dental handpiece according to claim 1, wherein the link groove comprises stops at its ends which limit the movement of the link block guided in the link groove.

6. The medical or dental handpiece according to claim 1, wherein the link groove comprises at least at one end a step over which the link block guided in the link groove can be moved.

7. The medical or dental handpiece according to claim 1, wherein the link block is formed in one-piece with the rotary knob or the link sleeve.

8. The medical or dental handpiece according to claim 1, wherein the link block holds the rotary knob rotatably on the head piece.

9. The medical or dental handpiece according to claim 1, wherein the link sleeve supports a spring element which pretensions the rotary knob and the link sleeve against one another.

10. The medical or dental handpiece according to claim 1, further comprising an engagement element movable relative to the tool holder, which can be moved in the direction of the tool holder by approach of the rotary knob in the direction of the tool holder to move the tool holder into the receive/release position.

11. The medical or dental handpiece according to claim 10, wherein the engagement element is configured as a part of the rotary knob.

12. The medical or dental handpiece according to claim 10, wherein the engagement element is configured as an element spaced apart from the rotary knob which can be contacted by the rotary knob by the approach of the rotary knob in the direction of the tool holder and can be moved with the rotary knob in the direction of the tool holder.

13. The medical or dental handpiece according to claim 1, further comprising a rotary arm provided on the rotary knob for rotating the rotary knob, wherein the rotary arm extends along the outside of the handle piece.

14. The medical or dental handpiece according to claim 13, wherein the rotary arm is rotatable with the rotary knob about the axis of rotation of the tool holder and simultaneously with the rotation about the axis of rotation approaches or moves away from the longitudinal axis of the handle.

15. The medical or dental handpiece according to claim 14, wherein the rotary arm is formed in one-piece with the rotary knob.

16. A medical or dental handpiece, comprising:

a handle piece extending along a longitudinal axis, a head piece arranged at an end of the handle piece, a tool holder arranged in the head piece rotatably about an axis of rotation for detachably receiving a treatment tool, an actuating device provided on the head piece and acting on the tool holder, which is configured to move the tool holder selectively into a receive/release position, in which the treatment tool can be received in the tool holder or removed therefrom, and a holding position, in which the treatment tool is held in the tool holder, and the actuating device comprises a rotary knob arranged on the head piece including an annular wall rotational relative to a link sleeve, and the rotary knob which can be rotated by a maximum of 90° about the axis of rotation of the tool holder to move the tool holder between the receive/release position and the holding position, wherein the actuating device comprises a link guide, the link guide comprising one of the annular wall and link sleeve including a link groove that extends in an arcuate ascending manner and the other of the annular wall and the link sleeve including a link block that extends into the link groove so that the rotary knob can rotate relative to the link sleeve, wherein the link guide is configured to guide the rotary knob such that when the rotary knob is turned, the rotary knob performs a rotary movement about the axis of rotation and a longitudinal movement along the axis of rotation of the tool holder so that, when the rotary knob moves along the axis of rotation towards the tool holder, the tool holder is moved into the receive/release position, and when the rotary knob moves away from the tool holder, the tool holder is moved into the holding position, and wherein movement of the rotary knob along the axis of rotation of the tool holder is simultaneous with rotation of the rotary knob about the axis of rotation.

17. The medical or dental handpiece according to claim 16, wherein the rotary knob comprises the link block which moves together with the rotary knob simultaneously along the axis of rotation by rotating the rotary knob about the axis of rotation.

18. The medical or dental handpiece according to claim 16, wherein the rotatability of the rotary knob about the axis of rotation is limited by at least one stop of the actuating device.

19. The medical or dental handpiece according to claim 18, wherein the at least one stop is part of the link guide.

20. The medical or dental handpiece according to claim 16, wherein the link sleeve comprises the link groove and wherein the link sleeve is arranged non-rotatably in the head piece.

* * * * *